United States Patent [19]

Danton

[11] Patent Number: 5,082,320
[45] Date of Patent: Jan. 21, 1992

[54] SEAT SUPPORT FOR PUBLIC TRANSPORT VEHICLES AND SEAT EQUIPPED WITH THIS SUPPORT

[75] Inventor: Jean-Louis Danton, Boulogne, France

[73] Assignee: Etablissements Compin, Paris, France

[21] Appl. No.: 420,587

[22] Filed: Oct. 12, 1989

[51] Int. Cl.⁵ ............................................. A47C 15/00
[52] U.S. Cl. ...................................... 296/63; 297/232
[58] Field of Search ................. 296/63, 64; 248/188.1, 248/628, 618, 629, 630; 297/232, 445, 450

[56] References Cited

U.S. PATENT DOCUMENTS

| | | | |
|---|---|---|---|
| Re. 29,271 | 6/1977 | Barecki . | |
| 3,619,006 | 11/1971 | Barecki . | |
| 3,951,454 | 4/1976 | Tantlinger . | |
| 4,118,062 | 10/1978 | Harder et al. . | |
| 4,120,533 | 10/1978 | Harder, Jr. | 297/232 X |
| 4,167,285 | 9/1979 | Fenner et al. | 297/232 X |
| 4,732,359 | 3/1988 | Danton | 296/63 X |
| 4,890,884 | 1/1990 | Olson | 297/232 |

FOREIGN PATENT DOCUMENTS

| | | |
|---|---|---|
| 0222632 | 5/1987 | European Pat. Off. . |
| 1026800 | 5/1953 | France . |
| 1535108 | 8/1968 | France . |
| 2374185 | 7/1978 | France . |
| 1198987 | 7/1970 | United Kingdom . |

*Primary Examiner*—Margaret A. Focarino
*Assistant Examiner*—Joseph D. Pape
*Attorney, Agent, or Firm*—Scully, Scott, Murphy & Presser

[57] ABSTRACT

The invention divulges a seat support of the cantilever type for public transport vehicles. This seat support has, in section through a vertical plane, a general upturned L shape with a horizontal part (16) which serves for fixing at least one seat and a vertical part or foot (18) which rests on the floor (12) of the vehicle or on an element fixed to the sidewall (14) thereof, one of said parts of the seat support being provided with a projection or spur (20) which engages in a housing (24) of corresponding shape formed in the sidewall (14).

5 Claims, 2 Drawing Sheets

SEAT SUPPORT FOR PUBLIC TRANSPORT VEHICLES AND SEAT EQUIPPED WITH THIS SUPPORT

The present invention relates to a seat support, of the cantilever type, for public transport vehicles as well as a seat equipped with this support.

It will be recalled that by cantilever seats are meant seats having a fixed cantilevered frame on a partition wall or sidewall of the vehicle. The main advantage of such seats resides of course in the fact that they have no feet, which facilitates cleaning under the seats. However, since they impose high forces on the wall on which they are fixed, it is necessary to reinforce the latter so that it can withstand the force transmitted by the seat support, amplified by the lever arm effect. But such reinforcements are expensive for it is necessary to increase the section of the wall.

It is in fact known that the wall of vehicles is constructed so that it withstands well a vertical force since its height itself gives it good inertia. On the other hand, it does not withstand well either a horizontally directed force, namely a force perpendicular to the plane of the wall, or a twisting force having an appreciable horizontal resultant, because constructors attempt to reduce its thickness as much as possible so as to increase the space provided for passengers.

Starting from this situation, the invention proposes a seat support in which the twisting force produced by a force applied vertically to the end of the branch supporting the seat is transformed into a vertical force, so that it is no longer necessary to reinforce the sidewall to which the seat support is fixed.

For this, the invention relates to a seat support of the cantilever type which is characterized in that, in section through a vertical plane, it has a general upturned L shape, having a horizontal part which serves for fixing at least one seat, and a vertical part or foot which rests on the floor of the vehicle and on an element integral with the sidewall thereof, one of said parts of the seat support being provided with a projection or spur which is engaged in a housing of corresponding shape formed in the sidewall or defined by a fastening element integral with the structure of the vehicle.

Such a seat support may be formed in several ways, but in any case, the spur must be positioned so that the tangent to the circular path which it tends to describe about the line of rotation of the seat support, under the action of a vertical force applied to the horizontal part, is contained in a vertical plane.

The horizontal part and the floor of the seat support may be made as a single piece. In this case, the spur will be situated at the lower portion of the foot since the line of rotation of the seat support is precisely at the base of the foot. Thus, the spur will always extend opposite the direction of the horizontal part of the seat frame. In this case, the mentioned circular path is that which the outer edge of the spur would follow in the event that the seat support were to be pivoted about its axis, particular in response to a vertical downward force being exerted against the horizontal seat frame. Moreover, a tangent line which is contemplated as being the tangent to such a circular path is the particular vector line whose vector direction would be perpendicular to the horizontal seat frame and/or the floor of the vehicle, such that no horizontal force component is generated in any mounting of the wall structure of the vehicle.

In another embodiment, the horizontal part may be independent of the foot, the latter being possibly an element fixed rigidly to the sidewall of the vehicle, for example a duct for the passage of pipes and conduits. The sitting portion may be laid on the foot or be secured thereto by any appropriate means. The line of rotation of the sitting portion being at the top of the foot, it is advantageous for the spur to be situated at the level of the horizontal part.

The spur and its housing may have any appropriate shape. For example, the spur may be in the form of a projection with triangular cross section having a lower horizontal face and an upper slanting face. The corresponding housing may then be defined by a slanting wall situated at the same level as the slanting face of the spur and having substantially the same slant as the latter, and possibly a bottom wall.

The spur and the housing may have a square or rectangular cross section. In this case, the position of the support with respect to the sidewall of the vehicle is adjustable. The support may in fact be spaced to a greater or lesser extent from the sidewall, as long as the spur still remains engaged inside the housing.

The seat support is fixed to the sidewall by means of fixing elements, such as bolts passing through horizontal holes formed through the vertical branch of the support and screwing into nuts situated in the sidewall.

Advantageously, the housing may be defined by a horizontal extruded section fixed to the sidewall and which runs along the whole length thereof. The seat support may thus be fixed at any point along the vehicle without having to bore a hole in the floor.

In the case where the seat is not situated close to the sidewall, the spur is engaged in a housing formed in an extruded section fixed to the floor of the vehicle.

To reinforce the stability of the vehicle, the vertical branch may be provided, on the side opposite the spur, with a slight flange bearing on the floor.

The invention will be better understood from the following description with reference to the accompanying drawings in which.

Figure 1:
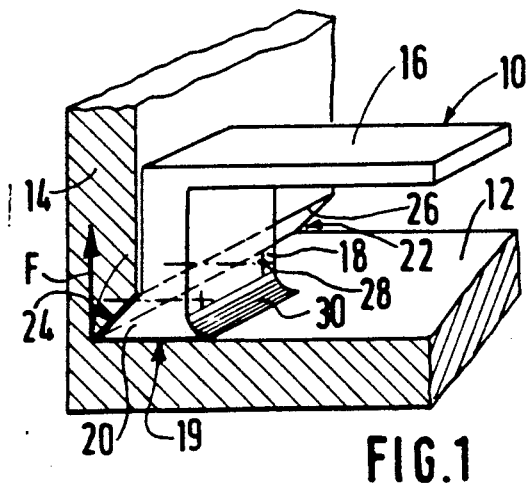
FIGS. 1 to 3 are perspective views in partial section of three embodiments of the support in which the spurs cooperate with the sidewall of the vehicle.

The seat support 10 shown in FIG. 1 has, in vertical section through a plane perpendicular both to floor 12 of the vehicle and to the sidewall 14 thereof, a substantially upturned L profile. The horizontal part 16 of the support serves as sitting portion for a seat (not shown), whereas its vertical branch or foot 18 is in contact with the sidewall.

The horizontal branch may be dimensioned so as to receive a seat with one, two or more places. The foot is thicker than the horizontal branch and rests by its lower edge 19 on the floor. It is provided on its outer face, preferably at the lower part of said face, with a projection or spur 20 which is able to fit inside a housing 22 of complementary shape formed in the sidewall 14.

The spur is shown in section with a triangular shape having a lower face in the extension of the lower edge of the floor and which therefore rests on the floor of the vehicle, and a slanting face 24 forming an acute angle with said lower face. The housing which receives said spur is formed by a groove at the base of the sidewall, and which comprises a re-entrant wall 26 slanted by the same angle as face 24 of the spur.

The groove may be formed along the whole length of the sidewall 14 so that seat support 10 may be installed at any point of the vehicle.

It will be noted that the space situated under the seat support is entirely clear, which facilitates maintenance and cleaning of the floor. When a bending force is exerted on a horizontal branch 16, the spur abuts against the reentrant wall 26 of the housing, thus preventing the support from swinging. The bending forces are taken up by the sidewall 14 of the vehicle and by the floor at the level of the bearing point of the lower cant angle of the vertical branch. The bending forces F are mainly exerted in the direction of the tangent T to the circumference described by the spur and centred on the inner cant angle of edge 19. To prevent the support from moving, it may be fixed to the extruded section by any appropriate fixing means 28.

The bending resistance is improved by providing a slight flange 30 extending under the seat, parallel to the horizontal branch and applied to the floor.

Figure 2:
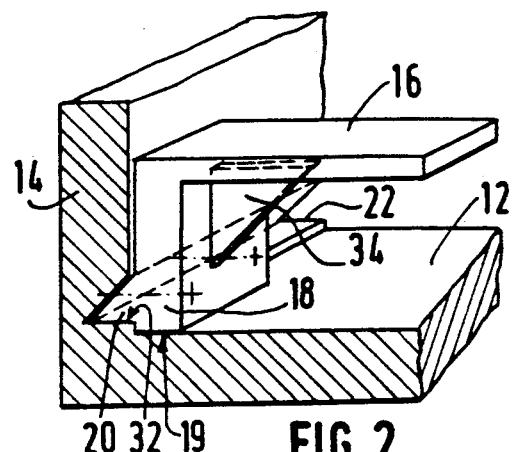

Instead of resting on the floor, the spur may bear on an element fixed to the floor or to the sidewall. FIG. 2 illustrates a seat support of this type in which spur 20 is formed slightly above the lower end of the foot. It is engaged inside a housing of complementary shape 22. The support rests both on floor 12 by its edge 19 and by the horizontal face of the spur on the horizontal face 32 of the housing which is slightly raised with respect to the level of the floor.

If necessary, and particularly if the horizontal branch 16 has a great length (the case of a double seat), a stay 34 is provided under this branch for supporting it. This stay is oblique and bears against foot 18. It may be integrally formed with the support, or be formed by a movable piece in the form of a slanting curvilinear triangle, one apex of which bears on the foot and the base of which is engaged in a groove formed in the lower face of the horizontal branch.

Figure 3:
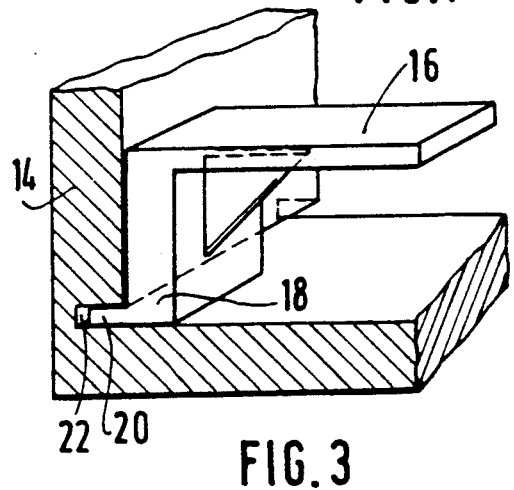

In the embodiment of FIG. 3, spur 20 is formed by a projection of rectangular cross section extending horizontally to the base of the foot. The housing which receives this spur has a groove shape with complementary cross section, formed at the base of the sidewall 14 of the vehicle.

This spur and housing shape has the advantage of making it possible to adjust the position of the seat with respect to the vertical wall. The adjustment distance is equal to the width of the spur.

Figure 4:
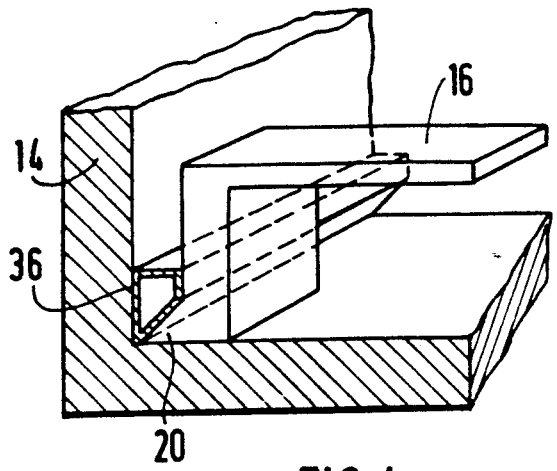
FIGS. 4 and 5 show two other embodiments in which the spurs bear on extruded sections.
Figure 5:
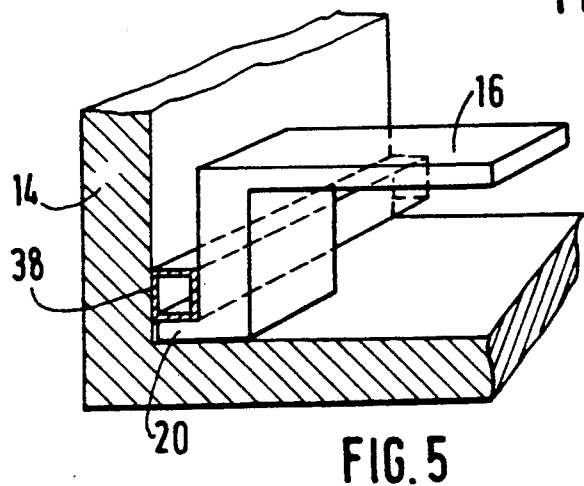

FIGS. 4 and 5 show respectively seat supports identical to those of FIGS. 1 and 3 but whose spurs 20 are engaged under an extruded section 36 or 38 of appropriate shape fixed to the sidewall of the vehicle.

Figure 6:
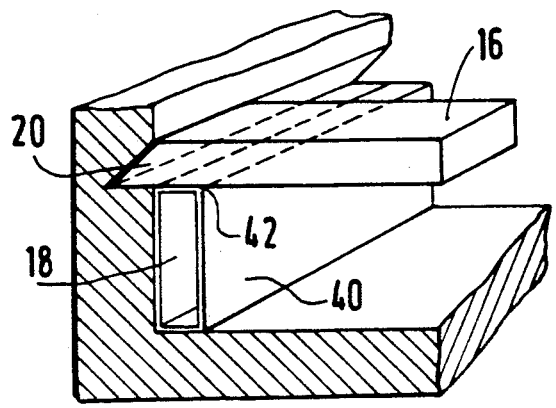
FIG. 6 shows another embodiment in which the spur is formed on the horizontal part of the support.

The seat support of FIG. 6 comprises an independent horizontal part 16 terminating at one end in a spur 20 which fits into a housing of corresponding shape provided in the sidewall of the vehicle. The foot is formed by a solid or hollow element, for example a duct 18 of rectangular or other section, which is fixed against the sidewall 14 and in which conduits are enclosed. This embodiment is very advantageous for it is possible to have access to the duct without having to dismantle the horizontal part 16. For access to the conduits, the front wall 14 of the duct may be formed by a removable cover.

The horizontal part may either be laid on the duct or fixed thereto. In use, it tends to pivot about the inner cant angle 42 of the duct. The twisting force produced by the weight of the user is thus transformed at the level of the spur into a vertical force contained in the sidewall.

Figure 7:
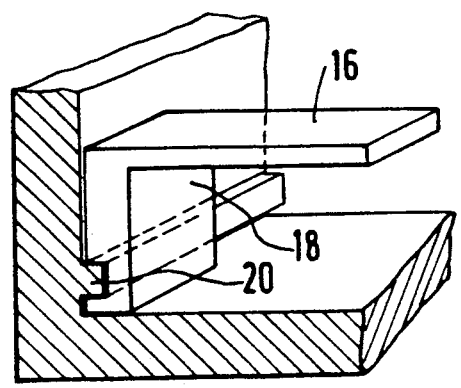
FIG. 7 shows another embodiment in which the spur is formed on the sidewall of the vehicle.

Finally, as illustrated in FIG. 7, the spur may be formed by a flange 20, for example of square section, extending along the whole length of the sidewall 14 and which is engaged in a complementary hollow housing formed in the foot.

Figure 8:
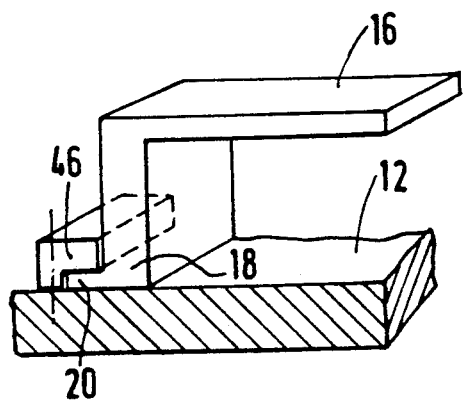
FIGS. 8 and 9 show two methods of fixing the seat supports in a position spaced away from the sidewall of the vehicle.

FIG. 8 shows one method of fixing a seat support in a position of the vehicle spaced away from the sidewalls. For this, the seat support is provided with a spur 20 similar to that of the embodiment of FIG. 3, but which may have the same form as that of FIG. 1. This spur is engaged under the horizontal branch of an extruded section 46 in the form of an upturned L fixed to the floor 12 of the vehicle by its vertical branch.

Figure 9:
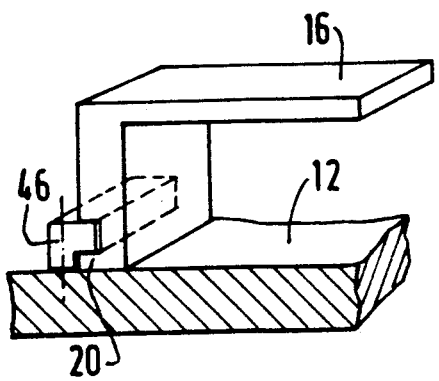

FIG. 9 shows a variant of the fixing method of FIG. 8 adapted to the seat support of FIG. 7.

The extruded section may also be in the form of a U lying on one of its legs, the other leg being engaged in a housing formed in the foot of the seat support.

I claim:

1. Seat support of a catilever type for public transport vehicles, wherein said seat support has an inverted L-shape in a vertical sectional view, including a horizontal seat supporting part for attaching at least one seat thereto and a vertical foot (18) depending downwardly from said seat supporting part and having a lower end supported on a structure of the vehicle, a spur (20) formed proximate the lower end of said foot and extending into a housing (24) of complementary shape formed in an upright portion of the structure of the vehicle, said spur extending generally in parallel with an in a direction opposite the extent of said seat supporting part from said foot, such that a vertical downward force exerted against said seat supporting means causes said spur to impart a vertically upwardly directed force to said upright portion of the vehicle structure while inhibiting the generating of horizontal force components.

2. Seat support according to claim 1, wherein said spur (20) is positioned on said foot so that a tangent to a circular path which said spur tends to describe about a line of rotation of the seat support responsive to said vertical downward force applied to said seat supporting part, it contained in a vertical plane.

3. Seat support according to claim 1, wherein said horizontal seat supporting part (16), said foot (18) and said spur (20) are of a unitary structure.

4. Seat support according to claim 1, wherein the spur is in the form of a projection with triangular cross section having a horizontal lower face (19) and a slanting upper face (24), and the corresponding housing is defined by a slanting wall (26) situated at the same level as the slanting face of the spur and having substantially the same slant as the latter, said housing having a bottom wall (32) which corresponds to the lower horizontal face of said spur.

5. Seat support according to claim 1, wherein said foot includes a flange (30) proximate the lower end thereof and extending opposite the direction of said spur, said flange (30) bearing on a floor surface of said vehicle structure.

* * * * *

UNITED STATES PATENT AND TRADEMARK OFFICE
CERTIFICATE OF CORRECTION

PATENT NO. : 5,082,320

DATED : January 21, 1992

INVENTOR(S) : Jean-Louis Danton

It is certified that error appears in the above-identified patent and that said Letters Patent is hereby corrected as shown below:

On the Title page, after Section [22] insert
--[30]    Foreign application priority date
    Oct. 14, 1988 [FR]    France............88 13551--

Column 3, line 53:  after "position" insert --of--

Column 3, line 16:  "reentrant" should read as --re-entrant--

Column 4, line 29, Claim 1:  "catilever" should read as --cantilever--

Column 4, line 39, Claim 1:  "an" should read as --and--

Column 4, line 50, Claim 2:  "it" should read as --is--

Signed and Sealed this

Twenty-eighth Day of September, 1993

*Attest:*

BRUCE LEHMAN

*Attesting Officer*    *Commissioner of Patents and Trademarks*